(12) United States Patent
Li et al.

(10) Patent No.: US 11,798,796 B2
(45) Date of Patent: Oct. 24, 2023

(54) PRECONCENTRATING OF ENVIRONMENTAL CONTAMINANT ANALYTES FOR AMBIENT IONIZATION MASS SPECTROMETRY

(71) Applicant: UNIVERSITY OF NEW HAMPSHIRE, Durham, NH (US)

(72) Inventors: Anyin Li, Somersworth, NH (US); Taoqing Wang, Durham, NH (US)

(73) Assignee: University of New Hampshire, Durham, NH (US)

( * ) Notice: Subject to any disclaimer, the term of this patent is extended or adjusted under 35 U.S.C. 154(b) by 266 days.

(21) Appl. No.: 17/252,586

(22) PCT Filed: Jun. 14, 2019

(86) PCT No.: PCT/US2019/037288
§ 371 (c)(1),
(2) Date: Dec. 15, 2020

(87) PCT Pub. No.: WO2019/241694
PCT Pub. Date: Dec. 19, 2019

(65) Prior Publication Data
US 2021/0280404 A1 Sep. 9, 2021

Related U.S. Application Data

(60) Provisional application No. 62/685,459, filed on Jun. 15, 2018.

(51) Int. Cl.
*H01J 49/00* (2006.01)
*H01J 49/16* (2006.01)
*G01N 1/40* (2006.01)

(52) U.S. Cl.
CPC ........ *H01J 49/0045* (2013.01); *G01N 1/4022* (2013.01); *H01J 49/167* (2013.01); *G01N 2001/4027* (2013.01)

(58) Field of Classification Search
CPC ............... H01J 49/167; G01N 1/4022; G01N 2001/4027
See application file for complete search history.

(56) References Cited

U.S. PATENT DOCUMENTS

| | | | |
|---|---|---|---|
| 2002/0158196 A1* | 10/2002 | Berggren | H01J 49/0454 250/288 |
| 2006/0110833 A1* | 5/2006 | Agnes | H01J 49/0431 250/282 |
| 2009/0071834 A1 | 3/2009 | Hafeman et al. | |
| 2015/0346170 A1* | 12/2015 | Huang | H01J 49/0031 436/500 |
| 2017/0084439 A1 | 3/2017 | Brown et al. | |
| 2017/0242030 A1* | 8/2017 | Novak | G01N 33/6851 |
| 2018/0120257 A1 | 5/2018 | Asiri et al. | |

OTHER PUBLICATIONS

International Search Report and Written Opinion from corresponding PCT Appln. No. PCT/US2019/037288, dated Sep. 9, 2019.

* cited by examiner

*Primary Examiner* — David A Vanore
(74) *Attorney, Agent, or Firm* — Grossman, Tucker, Perreault & Pfleger, PLLC (57) ABSTRACT

The present disclosure relates to a method and system of preconcentrating analytes in a solution within an emitter for ionization mass spectrometry and analysis.

18 Claims, 8 Drawing Sheets

PRECONCENTRATING OF ENVIRONMENTAL CONTAMINANT ANALYTES FOR AMBIENT IONIZATION MASS SPECTROMETRY

CROSS REFERENCE TO RELATED APPLICATIONS

This present application is a 371 of International Application No. PCT/US2019/37288 filed on Jun. 14, 2019 which claims the benefit of the filing date of U.S. Provisional Application Ser. No. 62/685,459 filed Jun. 15, 2018, the teachings of which are incorporated herein by reference.

FIELD

The present disclosure relates to a method and system of preconcentrating environmental contaminant analytes for ambient ionization mass spectrometry and analysis.

BACKGROUND

Preconcentration is a relatively important step in analytical chemistry and is often performed prior to performing analysis, such as mass spectrometry. Methods of preconcentration include, for example, extraction or cold trapping. In ambient ionization mass spectrometry, a number of methods are available including preconcentration through the Leidenfrost phenomenon, which may enhance the sensitivity of mass spectrometry by orders of magnitude, as well as preconcentration on an external surface of a selective membrane. These methods, however, may be difficult to control, restricting their applicability. In addition, known methods result in dead volumes that may be on the order of microliters or greater. To overcome the issue of dead volume, often mL size samples, and particularly samples hundreds of milliliters are required for analysis. Accordingly, room remains for improvement of preconcentration method, particularly for ambient ionization mass spectrometry.

BRIEF DESCRIPTION OF THE DRAWINGS

The above-mentioned and other features and advantages of the present disclosure, and the manner of attaining them, will become appreciated and be more readily understood by reference to the following detailed description in conjunction with the accompanying drawings, wherein:

FIG. 3b is a cross-section of the emitter of FIG. 3a;

DETAILED DESCRIPTION

The present disclosure relates to a method and system for preconcentrating analytes for delivery and analysis in ambient ionization mass spectrometry. Ambient may be understood as reference to ambient temperature (such as, e.g., in the range of 20° C. to 25° C.) as well as ambient pressure (such as, e.g., in the range of 0.5 atm to 1.2 atm). Generally, the method and system include loading the analyte or sample solution, including a compound of interest, into an emitter where the carrier fluid or solvent is evaporated. The method and system preferably increases the concentration level of the compound of interest by a factor in the range of $1\times10^1$ to $1\times10^6$ and more preferably in the range of $1\times10^3$ to $1\times10^6$. Compounds of interest may be present in the sample at levels of parts per trillion (ppt) to parts per billion (ppb) and then preconcentrated to levels of parts per billion (ppb) or parts per million (ppm). By way of example, a contaminant may initially be present in the range of 5 to 500 parts per trillion and, using the method and system herein, the concentration may be increased to 5 to 500 parts per billion.

Contaminants of interest may include, for example, bisphenol-A as well as perfluoroalkyl substances and polyfluoroalkyl substances such as perfluorinated carboxyl acids (PFCAs) and perfluorinated sulfonic acids (PFSAs). A PFCA of particular interest includes perfluoro-n-octanoic acid (PFOA), other PFCAs also of interest include perfluoro-n-penanoic acid, perfluoro-n-hexanoic acid, perfluoro-n-hepanoic acid, perfluoro-nonanoic acid, perfluoro-n-decanoic acid, perfluoro-n-undeanoic acid, perfluoric-n-dodecanoic acid, and perfluoro-n-tridecanic acid. A PFSA of particular interest includes perfluorooctane sulfonate (PFOS), other PFSAs of interest include perfluoro-1-butane sulfonic acid, perfluoro-1-pentane sulfonic acid, perfluoro-1-hexane sulfonic acid, perfluoro-1-hepane sulfonic acid, perfluoro-1-nonane sulfonic acid and perfluoro-1-decane sulfonic acid. Presently, it is understood that the Environmental Protection Agency (EPA) has set a health advisory level at 70 ppt for PFOAs and PFOSs contaminants. The contaminants may be carried in solvents such as water or an organic solvent. Organic solvents may include relatively small molecules, which preferably have a molecular weight of less than 2000 Dalton, including all values and ranges from 1 Dalton to 2,000 Dalton. Exemplary organic solvents, include, but are not limited to acetonitrile, isopropanol, acetyl acetate, hexane, and methanol.

Figure 1:
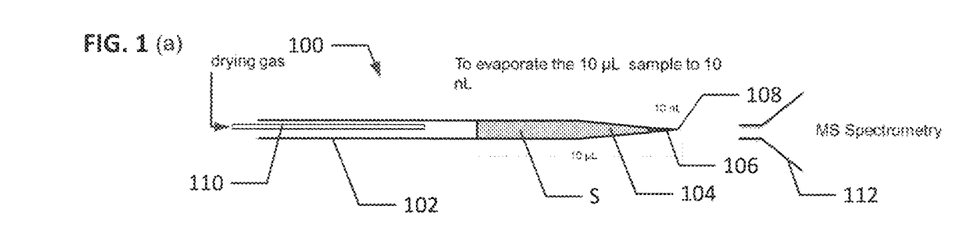
FIG. 1a is a schematic of an embodiment of a pulled glass emitter loaded with a sample solution, wherein the relatively low concentration solution is illustrated in light gray and dark gray, and wherein the dark gray illustrates the desired or targeted volume of solution after concentration.
FIG. 1b is a schematic of an embodiment of a system including pulled glass emitter with preconcentrated sample solution (illustrated in dark gray), being ionized and ejected into a mass spectrometer.

In the present method, a relatively low concentration sample solution S is loaded into the emitter 100, as illustrated in FIG. 1a. The emitter 100 is preferably a conical shaped emitter and more preferably, a pulled glass emitter; however, other materials may be used in addition to or alternatively to the pulled glass, such as metal emitters, silica emitters and fused silica emitters. Emitters that are non-conductive may, in some embodiments, be metallized, and particularly at the emitter tip, with an electrically conductive metal or metal alloy for later ionization of the contaminant solution. In addition, the emitters may exhibit a 0.5 mm to 2.0 mm internal diameter of the capillary 102, including all values and ranges therein, and preferably in the range of 0.7 mm to 1.0 mm. The outer diameter of the capillary of the emitter may be in the range of 1.00 mm to 3.0 mm, including all values and ranges therein, and preferably 1.5 mm. The inner diameter is preferably reduced at the cone 104 (shaded in dark gray in FIG. 1a) from the inner diameter of the capillary to an inner diameter of 1 μm to 50 μm at the tip 106 opening 108 of the emitter, including all values and ranges therein such as in the range of 3 μm to 20 μm. Solution volumes preferably in the range of 1 picoliter (pL) to 30 μL can be loaded into the emitter. In one embodiment, the solutions are backfilled via capillary action along a small filament inside the emitter.

The volume of sample solution is then preferably reduced several orders of magnitude by controlled evaporation of the solvent, increasing the concentration of the compound of interest. A drying gas may be provided to the capillary 102 of the emitter 100. In the system the drying gas is introduced into the capillary 102 through a needle 110 or tube inserted into the capillary 102. The drying gas may include, for example, dry air, nitrogen or another inert gas. Preferably, the gas includes less than 0.1% moisture by mass. The flow rate of the gas in the capillary 102 may be in the range of 0.01 L/min to 1.00 L/min, including all values and ranges therein. In addition, or alternatively, the solvent may be evaporated by leaving the sample at ambient conditions for a time period in the range of 0.1 to 100 minutes, including all values and ranges therein, and preferably in the range of 2 to 50 minutes and more preferably from 30 to 50 minutes, such as 40 minutes. Or, the solvent may be evaporated by oven dried at a temperature of 30° C. to 100° C., including all values and ranges therein and preferably 80° C., for a period of time in the range of 0.1 min. to 50 min, including all values and ranges therein.

As noted above, concentration level of the compound of interest may preferably be increased by a factor in the range of $1\times10^1$ to $1\times10^6$ and more preferably in the range of $1\times10^3$ to $1\times10^6$. For example, a contaminant may initially be present in the range of 5 to 500 parts per trillion and, using the method and system herein, the concentration may be increased to 5 to 500 parts per billion. Or, the sample solution volume may be reduced by a factor in the range of $1\times10^1$ to $1\times10^6$ and more preferably in the range of $1\times10^3$ to $1\times10^6$. Again, by way of example, a 10 μl sample may be reduced to a volume in the range of 0 nL to 300 nL. As alluded to herein, in some embodiments, the sample may be completely dried wherein there is no solvent remaining.

After the desired concentration has been achieved, the concentrated sample solution may be analyzed directly by, for example, relay electrospray ionization. Optionally, after the sample solution is dried, a second solvent (which may include any of the solvents noted above) is backfilled via capillary action along a filament inside the emitter. It may be appreciated that the first solvent and second solvent may be the same or may be different. Backfilling may be realized by the filament inside the emitter to assist in capillary action inside the emitter. The filament is preferably formed of glass. In the case where, for example, methanol is used to backfill a pulled glass emitter via capillary action, the average loading rate is 940 pL/s.

Figure 3A:
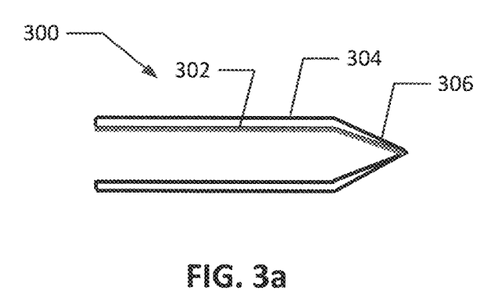
FIG. 3a illustrates a filament placed in an empty emitter contacting the inner wall of the capillary and tip.
Figure 3B:
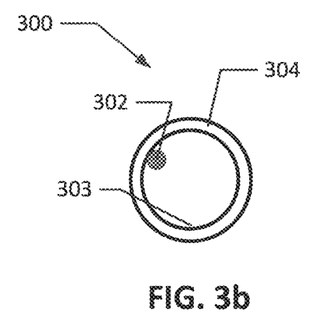
Figure 3C:
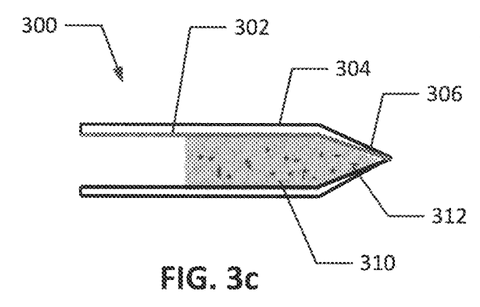
FIG. 3c illustrates an emitter including a filament and a sample solution.
Figure 3D:
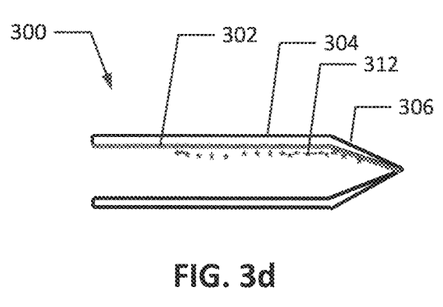
FIG. 3d illustrates the same emitter after the sample solution has dried, wherein the non-volatile analytes are preconcentrated along the filament inside this emitter.
Figure 3E:
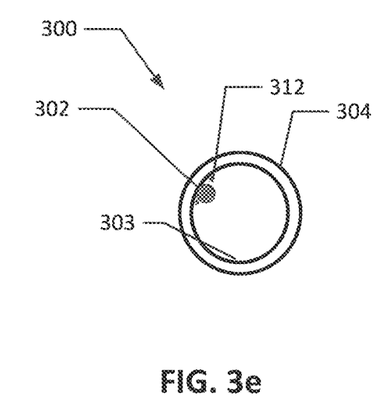
FIG. 3e illustrates a cross-sectional view the emitter of FIG. 3d after the sample solution has dried.
Figure 3F:
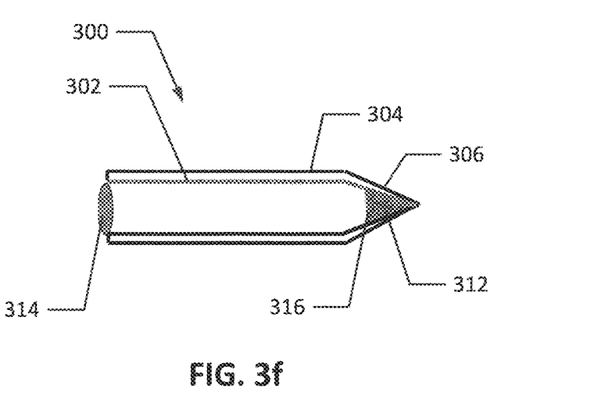
FIG. 3f illustrates an emitter including an extraction solvent added to the proximal end of the emitter. The extract solvent will travel along the filament to the distal end of the emitter due to capillary action. In this process, the preconcentrated or dried analyte is dissolved in the solution and carried to the distal end of the emitter.

FIG. 3a illustrates the placement of a filament 302 into the emitter 300. As illustrated, the filament 302 is preferably circular in cross-section and is placed adjacent to the inner wall 303 of the capillary 304 and optionally the tip 306. However, it may be appreciated that the filament may, in some embodiments, not be in contact with and may be offset from the inner wall 303. The filament 302 may exhibit a diameter, or largest linear cross-sectional dimension, in the range of 50 nm to 0.5 mm, including all values and ranges therein, such as 100 μm to 200 μm, and preferably in the range of 150 μm to 175 μm and more preferably 160 μm. FIG. 3c illustrates a sample solution 310 with the analyte 312 loaded into the emitter 300. FIGS. 3d and 3e illustrate the emitter 300 after at least a portion of the analyte solution 310 has dried. Preferably the remaining preconcentrated analytes 312, which are understood to be non-volatile, are deposited proximal to and along the filament 302. FIG. 3f illustrates the emitter 300 after backfilling the second solvent 314 into the capillary 304 by capillary action along the filament 302 to form a second analyte solution 316.

The backfilled solvent dilutes or dissolves the preconcentrated analytes to a desired enrichment factor. Where relay electrospray ionization will be used, a minimum of 1.0 picoliters (pL) and more preferably a minimum of 1.5 pL of sample is needed for each mass spectrometry scan. The total amount of sample and carrier fluid or solvent may preferably be in the range of 1 pL to 100 microliters (μL), and more preferably in the range of 1 pL to 10 μL.

After preconcentration, the solutions are preferably then ionized to generate analyte ions. In the examples, relay electrospray ionization triggered ionization of nanoliter volume sample, resulting in reproducible pulsed ion signals. However, other means of ionization may alternatively be used. The generated analyte ions may then be trapped, fragmented and analyzed by, for example, a linear ion trap mass spectrometer. The absolute intensities and relative ratios of the fragments may then be used for quantitation and quantification purposes.

Figure 3G:
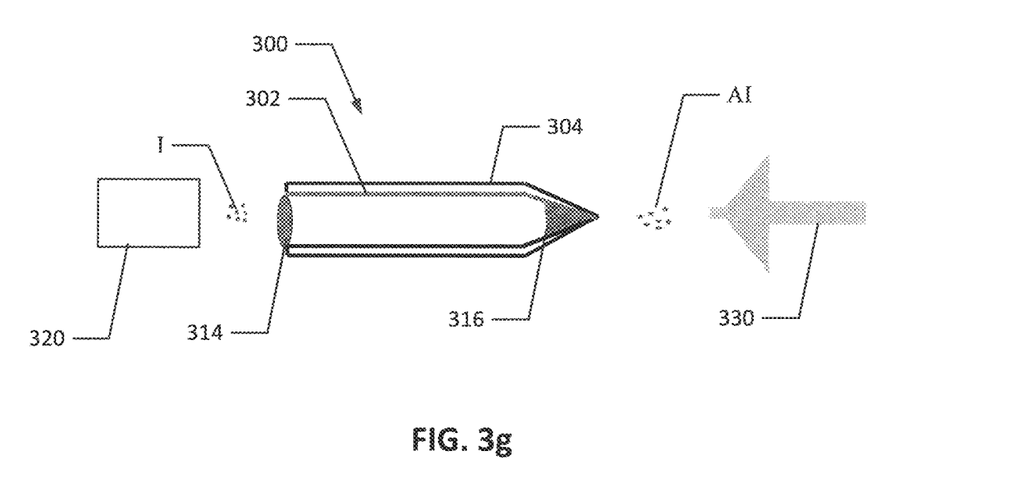
FIG. 3g illustrates an embodiment of ionizing the preconcentrated analytes and ionizing the analytes to provide them to a mass spectrometer.

The relay electrospray ionization process is illustrated in FIG. 1b. In relay electrospray ionization primary ions (I) from a piezoelectric discharge ion source 116 are directed towards the emitter to trigger the ionization of the preconcentrated analyte solution, forming a plume of charged small droplets that are charged. The ionized analyte (AI) is then emitted towards the mass spectrometer 112 for analysis. The process preferably occurs at ambient conditions. FIG. 3g illustrates relay electrospray ionization using the backfilled emitter illustrated in FIG. 3f. A primary ion source 320 again discharges ions (I) towards the backfilled emitter 300, with the preconcentrated analyte solution 316 at the tip 306. The analyte ions (AI) are then ejected from the analyte solution 316 towards the mass spectrometer 330 system for analysis. Again, the process preferably occurs at ambient conditions.

Figure 2:
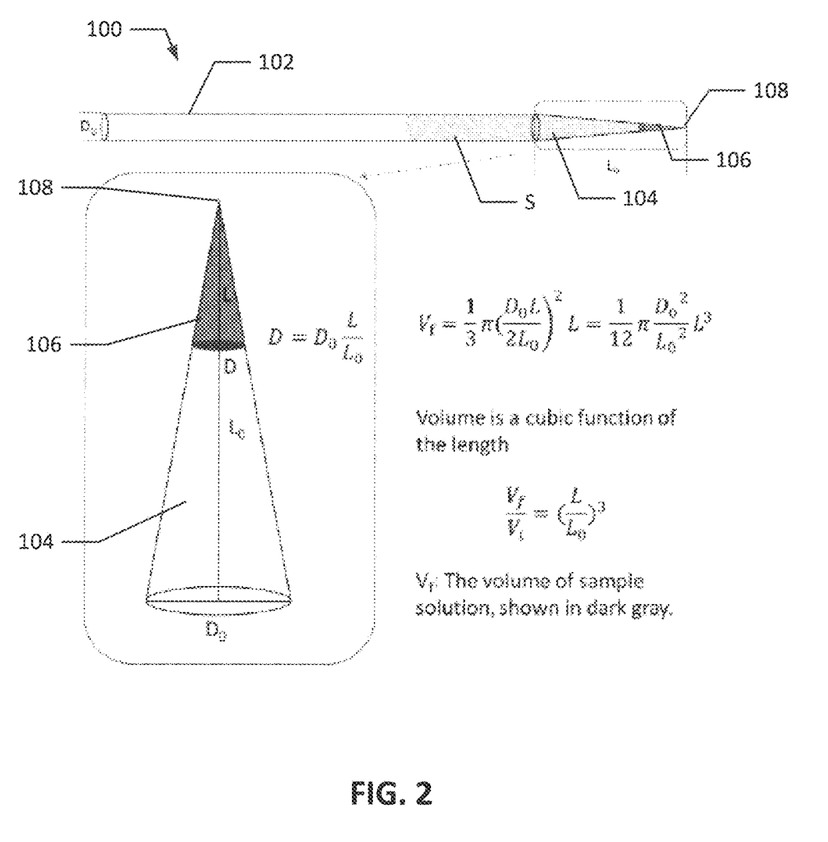
FIG. 2 is a schematic of a conical head capillary emitter used to monitor the preconcentration effect for the sample solution loaded, wherein the volume of sample solution is illustrated in dark gray.

The emitter, with a cylindrical body and a conical head region, and particularly the pulled glass emitter, may be advantageous for monitoring this preconcentration effect for solutions loaded in it. FIG. 2 illustrates a conical head capillary emitter used to monitor the preconcentration factor for sample solutions loaded, (it is noted that the numbering from FIGS. 1a and 1b has been maintained). In the cylindrical, capillary section, the volume is linearly related to length, wherein the volume may be calculated using equation 1.

$$V = \pi\left(\frac{D_o}{2}\right)^2 L, \quad \text{Equ. 1)}$$

wherein V is volume, $D_O$ is the capillary inner diameter and L is the length of the capillary. When in the conical head region, the volume is a cubic function of the length. The volume of the tapering inner diameter of the cone may be calculated as follows in equation 2.

$$V = \frac{1}{3}\pi\left(\frac{D_o}{2}\right)^2 L \quad \text{Equ. 2)}$$

wherein V is volume, $D_O$ is the capillary inner diameter and L is the length of the capillary. Accordingly, a 10-fold decrease in length of the analyte in the cone corresponds to 1000-fold increase in concentration.

FIG. 1b illustrates an embodiment of a system particularly for relay electrospray ionization, in which ions (I) generated by an ion source 116 are directed to interact with the emitter 100. This causes the analyte to discharge as charged droplets containing ions (AI) out of the emitter and into the mass spectrometer 112. The ions generated by the ion source may be either positive or negative ions or a combination thereof. A variety of ion sources may be employed including electrospray ionization, atmospheric pressure ionization, desorption electrospray ionization, atmospheric pressure dielectric barrier discharge ionization, or electrospray-assisted laser ionization. In preferred embodiments, the ion source is a plasma discharge source, such as a piezoelectric direct discharge plasma generator, which may be understood as a cold discharge or dielectric barrier discharge source which can ionize process gasses, including air, by a direct gas discharge of a piezoelectric transformer at relatively high voltage, preferably in the range of 1 to 10 kV, and at pressures in the range of 0.01 bar to 10 bar and more preferably at atmospheric pressure. Once captured by the mass spectrometer, the sample may be assessed. Methods of ionization of the sample are found in, for example, US Application Publication No. 2018/0040464, entitled "Systems and Methods for Relay Ionization", filed on Mar. 9, 2016, and incorporated by reference herein.

Figure 4A:
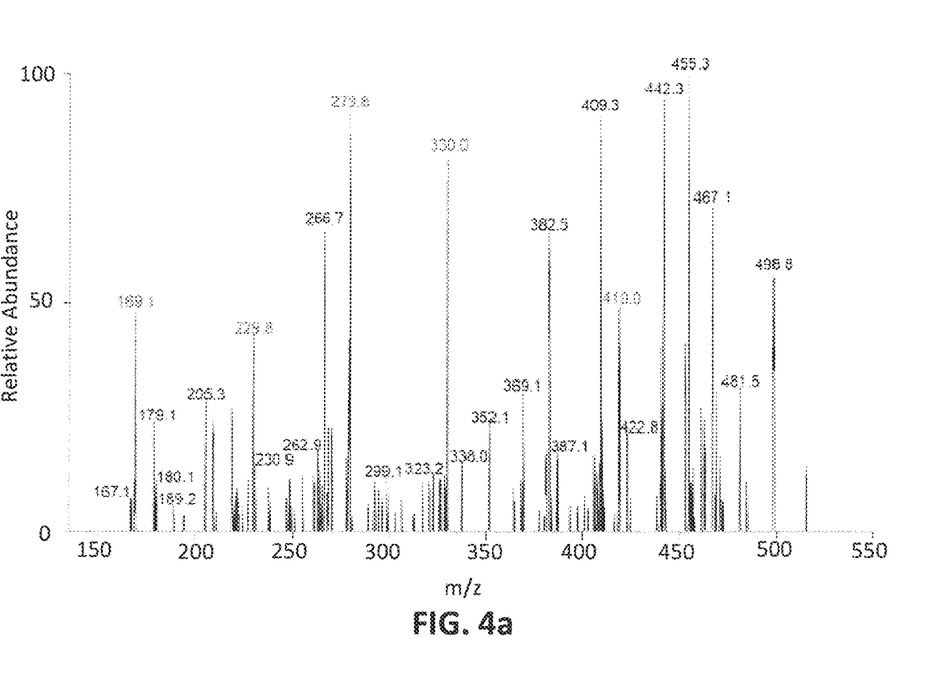
FIG. 4a is a graph of the analysis of a solution of 50 parts per trillion of PFOS without preconcentration.
Figure 4B:
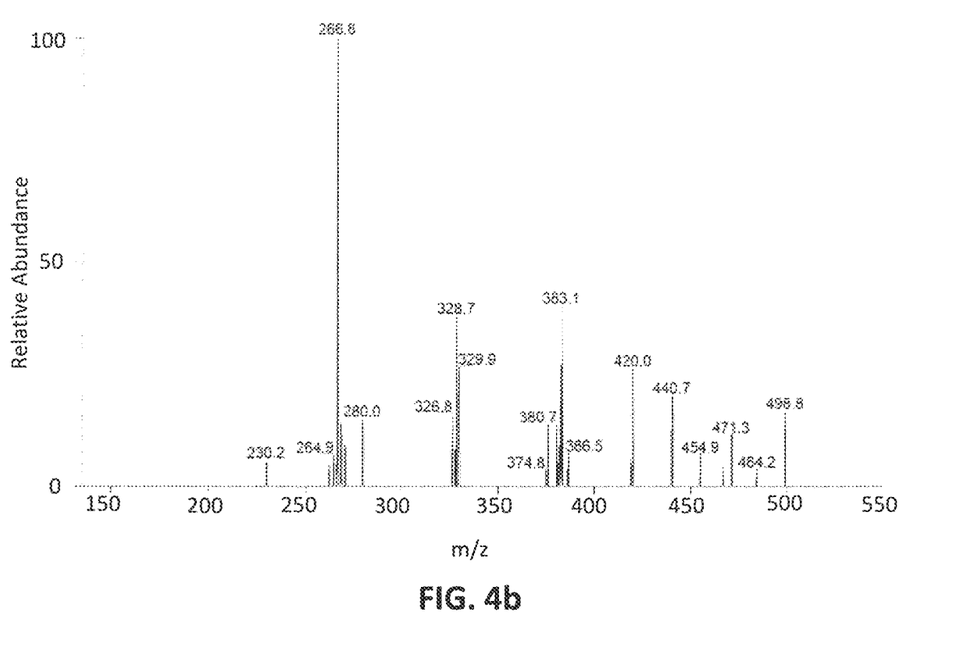
FIG. 4b is a graph of the analysis of the solution analyzed in FIG. 4a after preconcentration.

FIGS. 4a and 4b illustrate an enhancement in the analyte signal intensity for measurements taken by mass spectrometer of unconcentrated and preconcentrated analyte solutions, the preparation of the samples for these measurements is described further herein. In both examples, a 50 parts per trillion solution of perfluorooctane sulfonate (PFOS) in methanol was placed into emitters. One sample was then concentrated by evaporation the 10 μL sample to 80 nL by introducing air as a drying into the emitter. FIG. 4a illustrates the mass spectrometry signal for the solution of 50 ppt of PFOS without preconcentration and FIG. 4b illustrates the difference in the ion signal observed after preconcentration. As illustrated, without preconcentration, the signal seen in FIG. 4a included a relatively higher level of noise than observed for the preconcentrated solution seen in FIG. 4b. Further, intense ion signals were observed at m/z (mass number per charge number of ions) 418.9, m/z 329.9, m/z 279.8, m/z 229.9 and m/z 169.0 in the identification of PFOS by tandem mass spectroscopy (MS/MS) fragmentation.

Figure 5A:
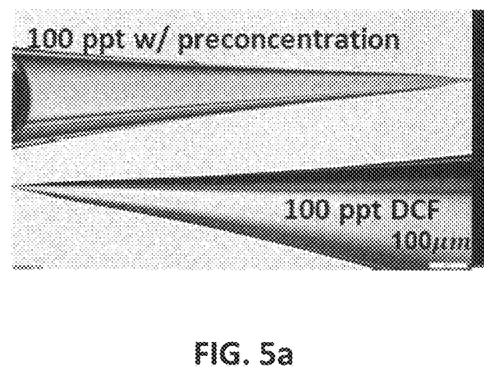
FIG. 5a is an image in bright field mode of a sample of 100 ppt DCF after preconcentration in the upper portion of the image and 100 ppf DCF without preconcentration in the lower portion of the image.
Figure 5B:
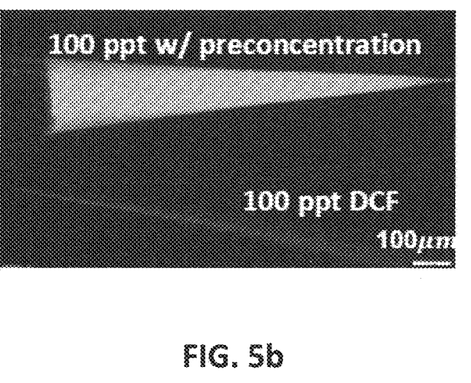
FIG. 5b is an image of the solutions of FIG. 4a taken in fluorescence mode, again the 100 ppt DCF after preconcentration is in the upper portion of the image and 100 ppt DCF without preconcentration is in the lower portion of the image.
Figure 5C:
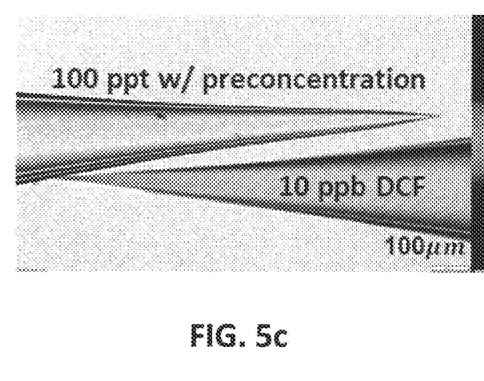
FIG. 5c is an image taken in bright field mode of 100 ppt DCF in solution after preconcentration in the upper portion of the image and 10 ppb concentration of DCF in solution in the lower portion of the image.
Figure 5D:
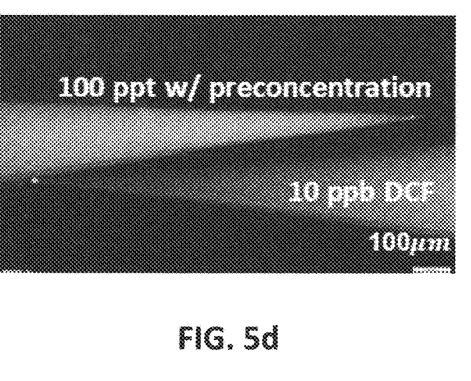
FIG. 5d was taken in fluorescence mode, including the 100 ppt DCF in solution after preconcentration in the upper portion of the image and the 10 ppb concentration of DCF in solution in the lower portion of the image.

Further, FIGS. 5a through 5d illustrate through fluorescence microscopy the effect of preconcentration. 2',7'-dichlorofluororescein (DCF) was used as a model compound in methanol as a solvent. The compound was prepared in solution at concentration levels of 100 ppt and 100 ppb. A 100 ppt concentration solution was also preconcentrated by over a factor of 100 or a concentration of greater than 10 ppb. FIG. 5a is an image in bright field mode of a sample of 100 ppt DCF after preconcentration in the upper portion of the image and 100 ppt DCF without preconcentration in the lower portion of the image. FIG. 5b is an image of the solutions of FIG. 5a taken in fluorescence mode, again the 100 ppt DCF after preconcentration is in the upper portion of the image and 100 ppt DCF without preconcentration is in the lower portion of the image. FIG. 5c is an image taken in bright field mode of 100 ppt DCF in solution after preconcentration in the upper portion of the image and 10 ppb concentration of DCF in solution in the lower portion of the image. FIG. 5d was taken in fluorescence mode, including the 100 ppt DCF in solution after preconcentration in the upper portion of the image and the 10 ppb concentration of DCF in solution in the lower portion of the image.

This method may be applied to the analysis of environmental contaminants at parts per trillion levels. In one example, preconcentrating enabled the detection of PFOS anion, for example, by the ion trap's activation parameters, which were optimized to produce extensive backbone fragmentation at m/z 169, m/z 230, m/z 280, m/z 330, and m/z 419. By comparing with the fragments of the 34S isotope peak at m/z 501, the structures of these fragments were elucidated. A random combination of the elimination of $SO_3$ group and the neutral loss of $CF_2$ was responsible for these fragments. The intensities of m/z 230 and m/z 330 relative to m/z 280 were 55±12%, and 65±13%. Compared with the selective reaction monitoring (SRM) transition (m/z 499 to m/z 80) currently used in the quantitation of PFOS, these backbone fragments provide additional validation information that could be valuable in the investigation of a wide range of PFAS metabolites and isomers. Using these backbone fragments, the limit of detection (LOD) of PFOS, e.g., is 50 ppt without pre-concentration. For solutions below this LOD, only with the in situ evaporative preconcentration could the characteristic fragmentation pattern be detected. Accordingly, controlled evaporation appears to be a relatively efficient and effective approach to the rapid analysis of ultra-low level target analytes.

Figure 6A:
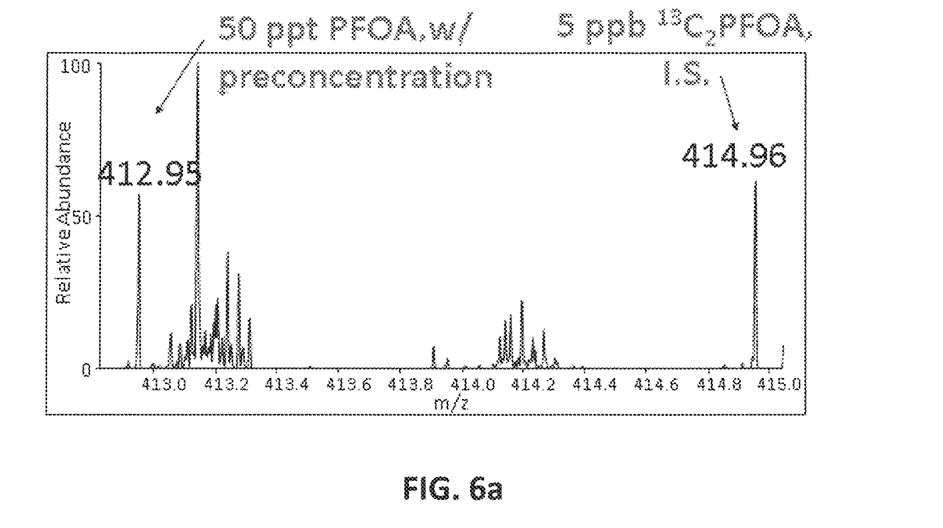
FIG. 6a illustrates a full scan mass spectrometry analysis of 50 ppt PFOA after preconcentrating by a factor of greater than 100 as compared to 5 ppb of PFOA.
Figure 6B:
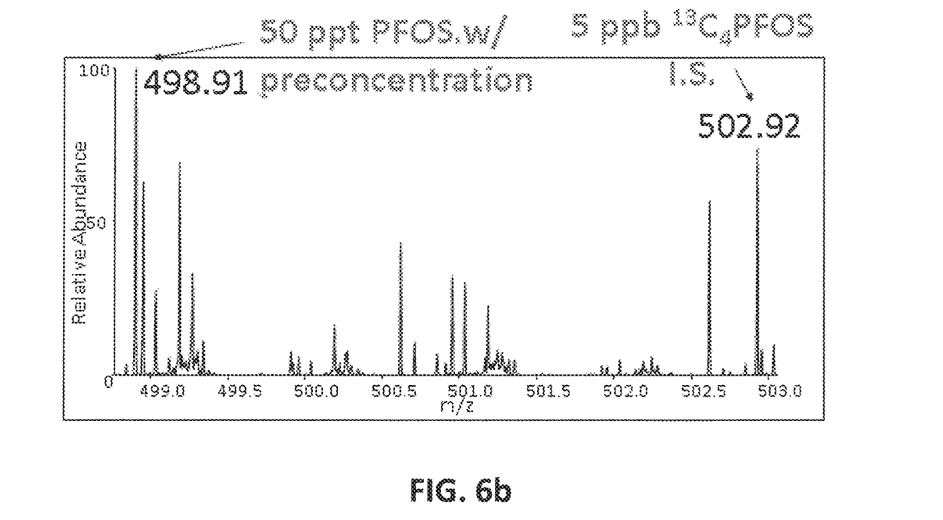
FIG. 6b illustrates a full scan mass spectrometry analysis of 50 ppt PFOS after preconcentrating by a factor of greater than 100 as compared to 5 ppb of PFOS.

Turning now to FIGS. 6a and 6b, these figures illustrate an example of the effect of preconcentration as confirmed by mass spectroscopy. The mass spectroscopy analysis of FIG. 6a was obtained by preparing a 50 ppt (part per trillion) PFOA sample in water or in acetyl acetate, which was loaded into a pulled glass emitter. This solution was dried without any gas under ambient conditions for a time period in the range of 2-40 minutes. A 5 ppb (part per billion) solution of isotopically labeled $^{13}C_2$ PFOA was prepared in the secondary solvent (methanol in this case), which was then backfilled into the glass emitter in which the 50 ppt PFOA sample were dried. These extracted mixed solution was then analyzed using mass spectrometry. The figures illustrate the 50 ppt analytes getting intensities similar to those of 5 ppb internal standards (I.S.), demonstrating a preconcentration factor of −100 times.

The mass spectroscopy analysis of FIG. 6b was obtained by preparing a 50 ppt (parts per trillion) PFOS sample in water or in acetyl acetate, which was loaded into a pulled glass emitter. This solution was dried without any gas under ambient conditions for a time period of 2-40 minutes. A 5 ppb (part per billion) solution of isotopically labeled $^{13}C_4$PFOS was prepared in the secondary solvent (methanol in this case), which was then backfilled into the glass emitter in which the 50 ppt PFOS sample were dried. These extracted mixed solutions were then analyzed using mass spectrometry. The figures illustrate the 50 ppt analytes getting intensities similar to those of 5 ppb internal standards (I.S.), demonstrating a preconcentration factor of −100 times.

Figure 7A:
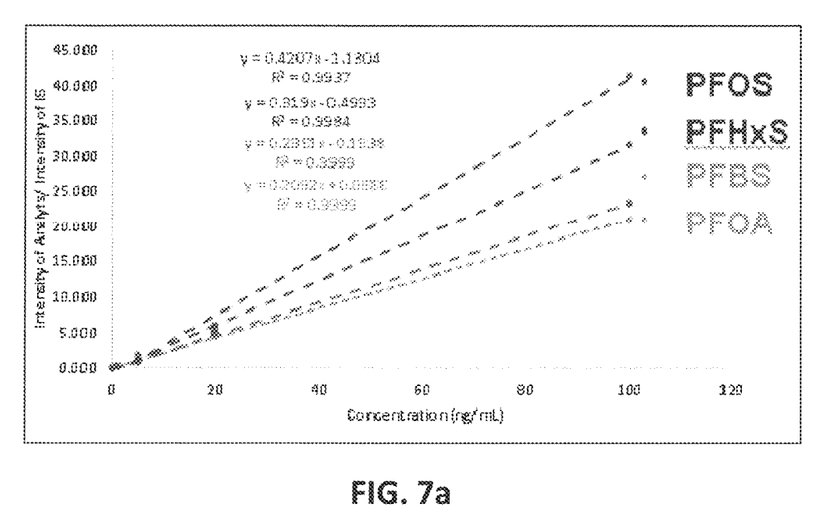
FIG. 7a provides calibration curves for the quantitation of a few example PFAS compounds using prepared according to the methods described herein and tandem mass spectrometry.
Figure 7B:
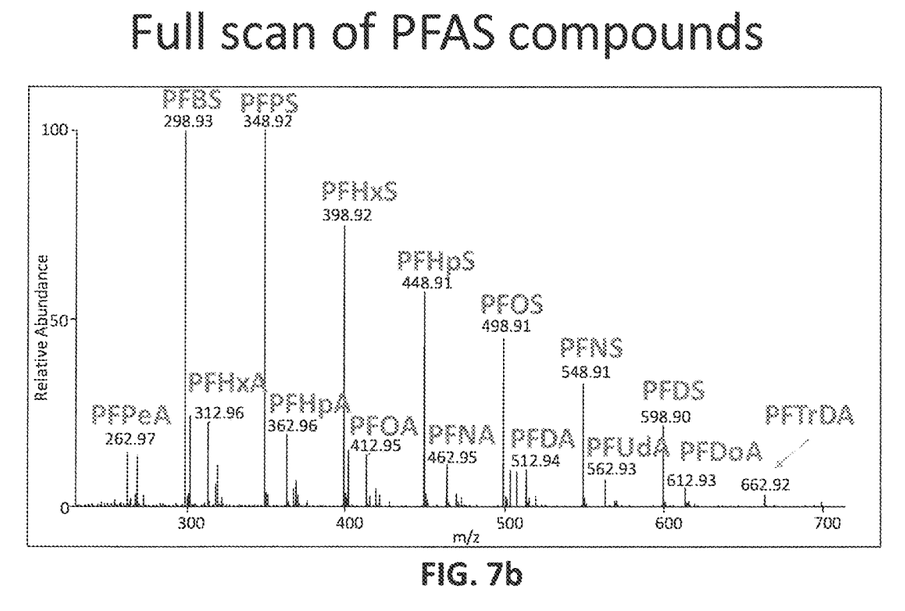
FIG. 7b illustrates a full scan mass spectrometry spectrum of 16 PFAS compounds as an example.

FIG. 7a illustrates calibration curves for various compounds including PFOS, perfluoro-1-hexane sulfonic acid (PFHxS), perfluoro-1-butane sulfonic acid (PFBS) and perfluoro-n-octanoic acid (PFOA) at various concentrations in water or in acetyl acetate. FIG. 7b illustrates full mass spectroscopy scans of PFAS compounds at a concentration of 50 ppt in water or in acetyl acetate. The PFAS compounds included perfluoro-n-penanoic acid (PFPeA), perfluoro-n-hexanoic acid (PFHxA), perfluoro-n-hepanoic acid (PFHpA), perfluoro-n-octanoic acid (PFOA), perfluoro-nonanoic acid (PFNA), perfluoro-n-decanoic acid (PFDA), perfluoro-n-undeanoic acid (PFUdA), perfluoric-n-dodecanoic acid (PFDoA), and perfluoro-n-trideconic acid (PFTrDA). The compounds also included perfluorooctane sulfonate (PFOS), perfluoro-1-butane sulfonic acid (PFBS), perfluoro-1-pentane sulfonic acid (PFPS), perfluoro-1-hexane sulfonic acid (PFHxS), perfluoro-1-hepane sulfonic acid (PFHpS), perfluoro-1-nonane sulfonic acid (PFNS) and perfluoro-1-decane sulfonic acid (PFDS).

Thus, provided herein are methods and systems that allow for the evaporation of samples of μL, nL and pL volumes that can be ionized and analyzed, particularly with minimal dead volume. Dead volume may be understood as the volume of sample solution sticking to certain regions of the analytical device and thus cannot be tested or analyzed. In the systems and methods herein, dead volume may be limited to volumes on the order of less than 50 femto liters. As alluded to above, the method and system for preconcentrating an analyte using the emitter may then be employed in electrospray ionization, which is understood as a technique used in mass spectrometry to produce ions using an electrospray in which a relatively high voltage is applied to a liquid to create an aerosol. However, other methods of ionizing the analyte may be utilized as well.

The foregoing description has been presented for purposes of illustration. It is not intended to be exhaustive or to limit the claims to the precise steps and/or forms disclosed, and obviously many modifications and variations are possible in light of the above teaching.

What is claimed is:

1. A method for preconcentrating one or more analytes in a solvent for ionization mass spectrometry analysis comprising:
   providing an emitter containing an analyte solvent solution at a first analyte concentration in said solvent;
   evaporating said solvent from said emitter and increasing the concentration of said analyte in said emitter to a second concentration; and
   ionizing said analyte solution having said second concentration of said analyte and discharging an ionized analyte into a mass spectrometer for analysis, wherein ions from a piezoelectric discharge ion source are directed towards said emitter to ionize said analyte solution having said second concentration of said analyte.

2. The method of claim 1 wherein said increase in the concentration of said analyte comprises an increase by a factor in the range of $1 \times 10^1$ to $1 \times 10^6$.

3. The method of claim 1 wherein drying gas is introduced into said emitter and evaporating said solvent of said analyte solvent solution to increase said concentration of said analyte to said second concentration.

4. The method of claim 3 wherein said drying gas is introduced into said emitter through a needle or tube inserted into said emitter.

5. The method of claim 3 wherein said drying gas is introduced into said emitter at a rate of 0.01 L/min to 1.00 L/min.

6. The method of claim 1 wherein said evaporation of said solvent occurs by placing said emitter in an oven at a temperature of 30° C. to 100° C.

7. The method of claim 1 wherein said emitter provides an analyte solution volume in in the range of 1 picoliter to 30 microliters.

8. The method of claim 1 wherein said emitter has a capillary portion having an internal diameter of 0.5 mm to 2.0 mm and cone portion having an inner diameter of 1 μm to 50 μm wherein said cone portion includes an opening.

9. The method of claim 1 wherein said analyte is present at a first concentration in the range of 5 to 500 parts per trillion and is present at said second concentration in the range of 5 to 500 parts per billion.

10. The method of claim 1 wherein said analyte comprises bisphenol A, perfluoroalkyl compounds, polyfluoroalkyl substances, perfluorinated carboxylic acids or perfluorinated sulfonic acids.

11. A method for preconcentrating analytes for ionization mass spectrometry analysis comprising:
    providing an emitter containing an analyte solvent solution containing an analyte at a first concentration in a first solvent wherein said emitter includes a needle or tube inserted into said emitter wherein said needle or tube is connected to a source of drying gas to enter said emitter and evaporate solvent from said emitter to cause an increase in concentration of said analyte;
    evaporating said first solvent from said emitter and increasing the concentration of said analyte in said emitter;

introducing a second solvent into said emitter wherein said analyte is present at a second concentration in said second solvent; and ionizing said analyte solution having said second concentration in said second solvent with an ion source such that ions generated by the ion source are directed to interact with the emitter and discharging an ionized analyte into a mass spectrometer for analysis.

12. The method of claim 11 wherein said increase in said concentration of said analyte in said emitter by evaporation of said first solvent includes depositing of said analyte in said emitter.

13. The method of claim 11 wherein said first solvent and second solvent are the same or different solvents.

14. The method of claim 11 wherein said emitter includes a filament and said second solvent is introduced into said emitter via capillary action along said filament.

15. The method of claim 14 wherein said filament has a diameter in the range of 50 nm to 0.5 mm.

16. The method of claim 14 wherein said analyte comprises bisphenol A, perfluoroalkyl compounds, polyfluoroalkyl substances, perfluorinated carboxylic acids or perfluorinated sulfonic acids.

17. A system for analyzing one or more analytes in a solvent for ionization spectrometry analysis, the system comprising:

an emitter configured to hold an analyte solvent solution including a needle or tube inserted into said emitter wherein said needle or tube is connected to a source of drying gas to enter said emitter and evaporate solvent from said emitter to cause an increase in concentration of said analyte;

an ion source that generates ions such that ions generated by the ion source are directed to interact with the emitter to cause the discharge of ionized analyte into a mass spectrometer for analysis.

18. A method for preconcentrating one or more analytes in a solvent for ionization mass spectrometry analysis comprising:

providing an emitter containing an analyte solvent solution at a first analyte concentration in said solvent;

evaporating said solvent from said emitter and increasing the concentration of said analyte in said emitter to a second concentration;

ionizing said analyte solution having said second concentration of said analyte and discharging an ionized analyte into a mass spectrometer for analysis; and wherein said analyte is present at a first concentration in the range of 5 to 500 parts per trillion and is present at said second concentration in the range of 5 to 500 parts per billion.

* * * * *